United States Patent
Dennis et al.

(10) Patent No.: US 7,165,136 B2
(45) Date of Patent: Jan. 16, 2007

(54) SYSTEM AND METHOD FOR MANAGING BUS NUMBERING

(75) Inventors: Lowell B. Dennis, Plugerville, TX (US); Orbie A. Welch, Round Rock, TX (US); Ricardo L. Martinez, Austin, TX (US); Colin McCann, Austin, TX (US); MyPhuong N. Sang, Austin, TX (US); Marc D. Alexander, Cedar Park, TX (US); Todd W. Schlottman, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 11/225,147

(22) Filed: Sep. 13, 2005

(65) Prior Publication Data

US 2006/0010278 A1 Jan. 12, 2006

Related U.S. Application Data

(63) Continuation of application No. 10/101,084, filed on Mar. 19, 2002, now Pat. No. 6,973,525.

(51) Int. Cl.
*G06F 13/14* (2006.01)
(52) U.S. Cl. .................. 710/305; 710/306; 710/311; 710/104
(58) Field of Classification Search ............... 710/306, 710/311, 305, 260–266, 312, 104
See application file for complete search history.

(56) References Cited

U.S. PATENT DOCUMENTS

| | | | |
|---|---|---|---|
| 5,734,850 A * | 3/1998 | Kenny et al. | 710/306 |
| 5,761,448 A * | 6/1998 | Adamson et al. | 710/104 |
| 5,892,964 A | 4/1999 | Horan et al. | 395/800.23 |
| 6,167,476 A | 12/2000 | Olarig et al. | 710/128 |
| 6,272,582 B1 | 8/2001 | Streitenberger et al. | 710/129 |
| 6,295,566 B1 | 9/2001 | Stufflebeam | 710/103 |
| 6,324,609 B1 | 11/2001 | Davis et al. | 710/119 |
| 6,330,656 B1 | 12/2001 | Bealkowski et al. | 712/13 |
| 6,748,478 B1 * | 6/2004 | Burke et al. | 710/312 |

* cited by examiner

*Primary Examiner*—Rehana Perveen
*Assistant Examiner*—Kim T. Huynh
(74) *Attorney, Agent, or Firm*—Hamilton & Terrille, LLP; Robert W. Holland

(57) ABSTRACT

Bus numbering management for an information handling system, such as a personal computer, is provided by interfacing one or more selectively hidden devices with one or more buses through either a hardware or software implementation. If an inactive bus becomes active, then disabling of a selectively hidden device interfaced with another active bus provides a bus number to the newly active bus. For instance, if a graphics capability is added to a computer system through a PCI bus, a PCI bridge associated with a second PCI bus is disabled so that the PCI bus number for the portion of the second PCI bus between the chipset of the computer system and the PCI bridge is available for use as the PCI bus number for the PCI bus associated with the graphics capability. The PCI bus number for the portion of the second PCI bus between the PCI bridge and existing peripheral devices is available for use for both portions of the second PCI bus. Thus, peripheral devices associated with the second PCI bus will continue to be recognized by the operating system as associated with the same PCI bus number. Alternatively, instructions associated with the PCI bus controller enables or disables a virtual device by handling input/output accesses.

26 Claims, 4 Drawing Sheets

SYSTEM AND METHOD FOR MANAGING BUS NUMBERING

This application is a continuation of application Ser. No. 10/101,084, filed Mar. 19, 2002, now U.S. Pat. No. 6,973,525, entitled System and Method for Managing Bus Numbering naming Lowell B. Dennis, Orbie A. Welch, Ricardo L. Martinez, Cohn McCann, MyPhuong N. Sang, Marc D. Alexander and Todd W. Schlottmann as inventors, which is hereby incorporated by reference in its entirety.

BACKGROUND OF THE INVENTION

1. Field of the Invention

The present invention relates in general to the field of information handling systems, and more particularly to a system and method for managing bus numbering in computer systems, such as PCI bus numbering.

2. Description of the Related Art

As the value and use of information continues to increase, individuals and businesses seek additional ways to process and store information. One option available to users is information handling systems. An information handling system generally process, compiles, stores and/or communicates information or data for business, personal or other purposes thereby allowing users to take advantage of the value of the information. Because technology and information handling needs and requirements vary between different users or applications, information handling systems may also vary regarding what information is handled, how the information is handled, how much information is processed, stored or communicated, and how quickly and efficiently the information may be processed, stored or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store and communicate information and may include one or more computer systems, data storage systems, and networking systems.

The use of a variety of hardware and software components with information handling systems sometimes leads to difficulty in configuring the systems to operate properly. For instance, a typical computer system may accept a number of cards in slots to provide different functions by interfacing peripheral devices through the cards with the computer system's central processing unit (CPU) over one or more buses. One standard for communication with cards over a bus is the Peripheral Component Interconnect (PCI) standard. A PCI bus allows a variety of peripheral devices to communicate over one or more PCI buses with the CPU, typically through a chipset. For instance, a network interface card (NIC) fits into a slot of the computer system to establish network communications with the CPU through the computer system's chipset. Similarly, an accelerated graphics port (AGP) card fits into an AGP slot to communicate between the CPU and a video display. The use of a standardized bus system provides improved flexibility in the hardware configuration of a computer system, although the greater number of potential hardware components presents some difficulty in ensuring that the type of component used is recognized by the computer system and operated with appropriate software.

One example of the difficulty in configuring a computer system to operate with different hardware and software components over a standardized bus is illustrated by FIG. 1. A CPU 10 interfaces with a chipset 12 through a host bus 14. Chipset 12 facilitates communication over a PCI bus 16 to one or more PCI slots 18 to allow communication between peripheral devices and CPU 10 by inserting the peripheral devices as cards into PCI slots 18. For instance, a NIC card inserted into a PCI slot 18 allows CPU 10 to establish communications over a network. Chipset 12 also facilitates communication over a PCI bus 20 with an AGP slot 22 to support an AGP card 24 for communication between a display 26 and CPU 10. In some cases, such as with Intel Corporation's 815 and 845 models, an integrated video controller 28 is included with chipset 12 to allow separate communication with a display 26 over a display interface.

With some operating systems, such as WINDOWS NT, a computer system using integrated video controller 28 re-numbers the PCI buses when an AGP card 24 is added to AGP slot 22 so that the PCI bus 20 is numbered as the first PCI bus and the PCI bus 16 is changed from being numbered as the first bus to being numbered as the second bus. In this manner, a video display is supported over a PCI bus instead of the integrated video controller. However, such re-numbering of buses typically leads to failure of devices associated with the re-numbered bus, such as the NIC card in the above example since the computer system's operating system is not configured for communicating with the device over the newly assigned bus number. In the case of such a failure, the devices typically must be manually re-configured. Alternatively, with some operating systems, such as WINDOWS XP, plug and play functionality allows recognition of the devices associated with the re-numbered bus but still typically requires re-configuration of the devices associated with the re-numbered bus. With corporate information systems, the addition of new hardware to a set of systems can create substantial management problems as systems need re-configuration to operate with changes to the hardware.

SUMMARY OF THE INVENTION

Therefore a need has arisen for a system and method which manages bus numbering when a peripheral device is added to an information handling system.

A further need exists for a system and method which maintains PCI bus numbering for a PCI bus associated with one or more peripheral devices when a device is added to a computer system on a previously inactive PCI bus.

A further need exists for a system and method which manages PCI bus numbering when a video graphics card is interfaced with a computer system PCI bus to replace the use of an integrated video controller of the computer system chipset.

In accordance with the present invention, a system and method are provided that substantially reduces or eliminates problems and disadvantages associated with previous methods for bus numbering management in an information handling system. A selectively hidden device is interfaced with a bus and enabled to assume a first bus number and one or more peripheral devices are interfaced with the bus to assume a second bus number. If an additional device subsequently interfaces with the information handling system through the bus, the selectively hidden device is disabled to allow the additional device to assume the first bus number, thus allowing the bus associated with the existing peripheral devices to maintain the second bus number.

More specifically, in one embodiment, first and second buses, such as PCI buses, interface with a computer system CPU, such as through a chipset. The first bus interfaces with a device slot that is inactive and does not take a number in the PCI bus numbering sequence. The second bus has a first portion that interfaces from the CPU or chipset to a selectively hidden device, such as a PCI bridge or trap handler module, and a second portion that interfaces from the selectively hidden device to one or more slots having one or more associated peripheral devices, such as a NIC card for network communication. The selectively hidden device is enabled so that the first portion of the second bus is associated with the selectively hidden device and assigned a first number in the bus numbering sequence and the second portion of the second bus is associated with the peripheral devices and assigned a second number in the bus numbering sequence. A bus numbering controller interfaces with the selectively hidden device to disable the selectively hidden device if the first bus becomes active, such as by interfacing a card or device with the first bus. The disabling of the selectively hidden device provides the first number of the bus numbering sequence to the first bus and allows the second bus associated with the installed peripheral device to maintain the second number in the bus numbering sequence. The bus numbering controller enables the selectively hidden device if the first bus becomes inactive so that the first number in the bus numbering sequence is provided to the first portion of the second bus and the second portion continues to maintain the second number in the bus numbering sequence.

In one example of a specific embodiment, the present invention manages bus numbering for a computer system having a chipset with an integrated video controller that also supports a video graphics card, such as an AGP card, over a PCI bus having a graphics card slot. If the integrated video controller is in use to support a video display and the PCI bus associated with the graphics card slot is inactive, then an operating system, such as WINDOWS NT, on the computer system will not assign a bus number to the inactive bus. A detector detects that the PCI bus associated with the graphics card slot is inactive and signals a PCI bridge controller to enable a PCI bridge interfaced with a second PCI bus. For instance, instructions running on the computer system's BIOS enable the PCI bridge during boot so that the operating system recognizes the PCI bridge and assigns a first bus number to the second PCI bus for the portion between the chipset and the PCI bridge and a second bus number to the second portion of the second PCI bus for the portion between the PCI bridge and one or more device slots. If the detector detects that the first PCI bus becomes active, for instance due to the insertion of an AGP card into the video graphics slot, the detector signals the PCI bridge controller which disables the PCI bridge. The operating system then does not recognize the disabled PCI bridge so that the first PCI bus is assigned the first bus number and the second PCI bus is assigned the second bus number. In this manner, the operating system continues to recognize devices associated with the second bus number.

In another example of a specific embodiment, the selectively hidden device is provided by a software module that creates a virtual PCI bridge associated with the second PCI bus. For instance, a trap handler module associated with the PCI bus controller traps input/output (I/O) accesses to the PCI address and PCI data registers associated with the second PCI bus to present a virtual PCI bridge to the operating system. If the first bus is inactive, the trap handler processes I/O accesses to the virtual PCI bridge to use both the first and second bus numbers, with the first bus number associated with the virtual PCI bridge and the second bus number associated with the peripheral devices of the second bus. If the first PCI bus becomes active, such as by the interfacing of an AGP card or video device, then the trap handler disables the virtual PCI bus by ceasing the processing of I/O accesses to the PCI address of the virtual device. Thus, the first bus assumes the first bus number and the bus numbering for existing peripheral devices remains unchanged.

The present invention provides a number of important technical advantages. One example of an important technical advantage is that bus numbering is managed to reduce configuration difficulty when peripheral devices are added or removed from an information handling system. Interfacing a selectively hidden device with one or more buses allows indirect control of operating system bus numbering. For instance, the BIOS selects whether or not to allow the operating system to recognize the selectively hidden device in order to control operating system numbering of buses.

Another example of an important technical advantage is that devices associated with a PCI bus number are maintained by the operating system on that PCI bus number even if peripheral devices are added to a previously inactive PCI bus that precedes the existing bus number. The insertion of one or more PCI bridges with a PCI bus allows the bus to assume multiple numbers in the PCI bus numbering sequence. Thus if devices are added to bring another PCI bus from an inactive to an active state, a PCI bridge is disabled to provide its number in the PCI numbering sequence to the newly active PCI bus. Existing devices associated with the already active PCI bus are thus maintained by the operating system as associated with the same bus number, reducing or eliminating the need to re-configure the existing devices.

Another example of an important technical advantage of the present invention is that computer systems using video controllers integrated with their chipset are able to add a graphics card capability through a PCI bus without changing PCI bus numbering. For instance, if the operating system numbers PCI buses associated with graphics cards with a number that precedes other PCI buses, then the disabling of a PCI bridge associated with a PCI bus following in the PCI bus numbering sequence provides a preceding bus number to a PCI bus that adds a graphics card capability. Thus, the addition of a graphics device to a computer system through a PCI bus interface will not change the bus numbering for PCI buses associated with other peripheral devices, reducing or eliminating the need for re-configuration of the other peripheral devices.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Preferred embodiments of the present invention are illustrated in the figures, like numerals being used referred to like and corresponding parts of the various drawings.

The present invention manages bus numbering in an information handling system, such as a personal computer, by including a hardware device or software virtual device that is selectively hidden from the operating system in order to selectively assume or release a sequence in bus numbering. If an additional peripheral device is interfaced with the information handling system and has a sequence in the bus numbering that precedes the selectively hidden device, then the selectively hidden device is disabled to allow the additional peripheral device to assume the selectively hidden device's sequence in the bus numbering. In this manner, other peripheral devices having a sequence in bus numbering following that of the hidden device continue to operate with their existing bus numbering sequence. Thus, the selectively hidden device takes up a bus number until that bus number is needed by a device with a preceding bus number and then the hidden device becomes a phantom to the information handling system, disappearing to release its bus number for use by the device with the preceding bus number and allowing devices with following bus numbers to continue operations with their previously assigned bus number. The selective enablement and disablement of the device to assume and release a bus number may be used to manage PCI bus numbering throughout a bus numbering sequence so that existing devices are associated with predetermined bus numbers as other devices are added or deleted from the information handling system.

Figure 1:
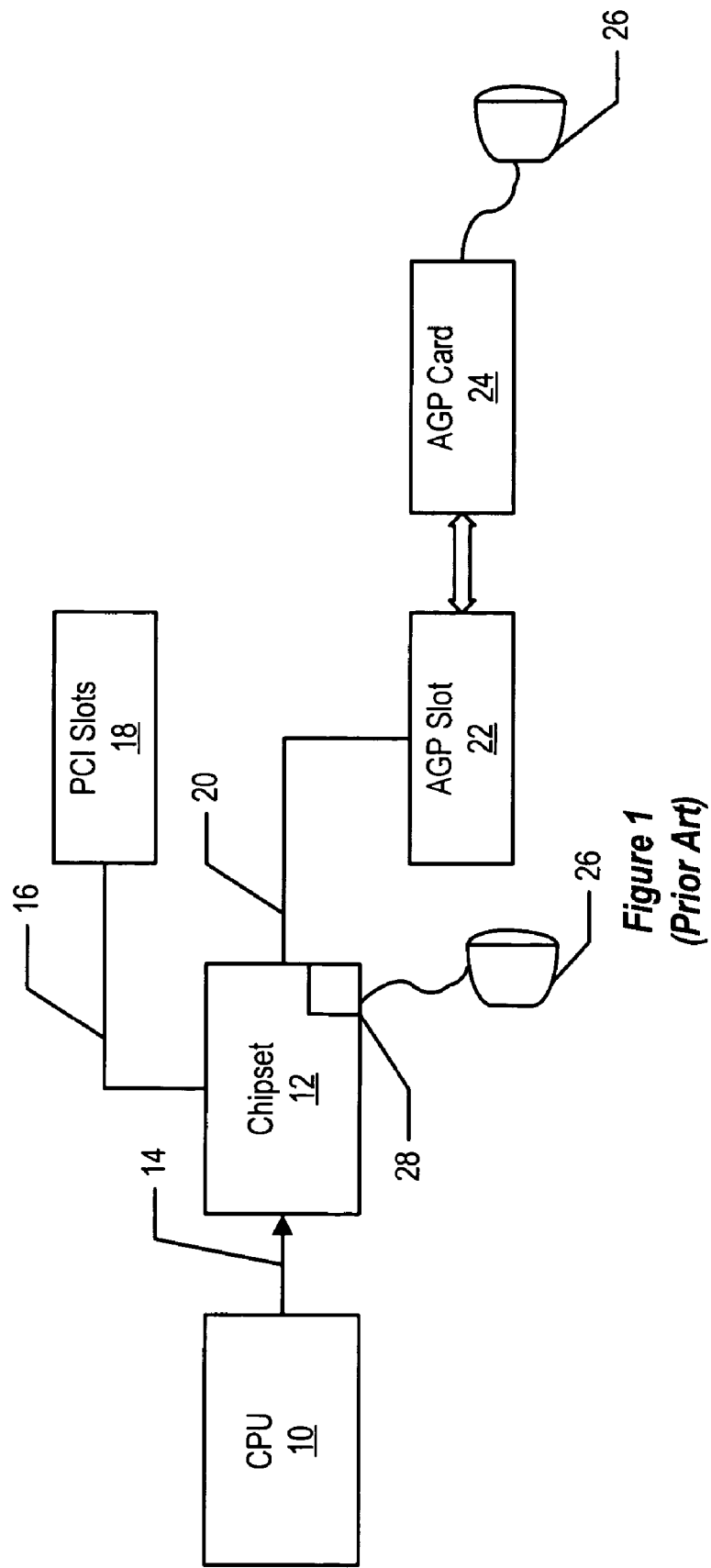
FIG. 1 depicts a block diagram of an information handling system having bus numbering with an integrated video controller and an AGP card.
Figure 2A:
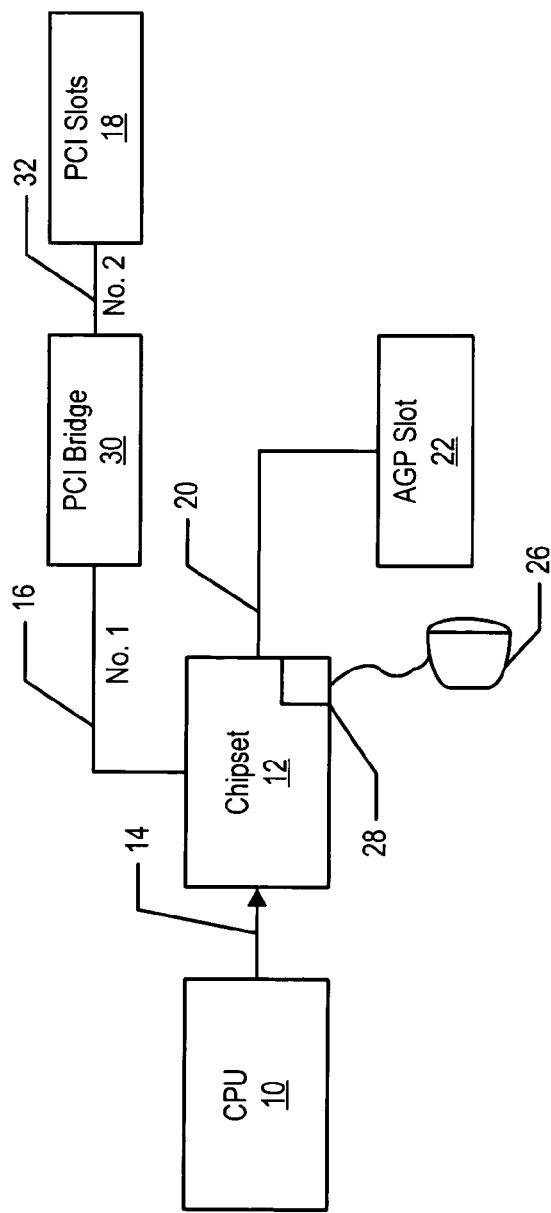
FIG. 2A depicts a block diagram of an information handling system having an enabled selectively hidden device and an inactive preceding bus.
Figure 2B:
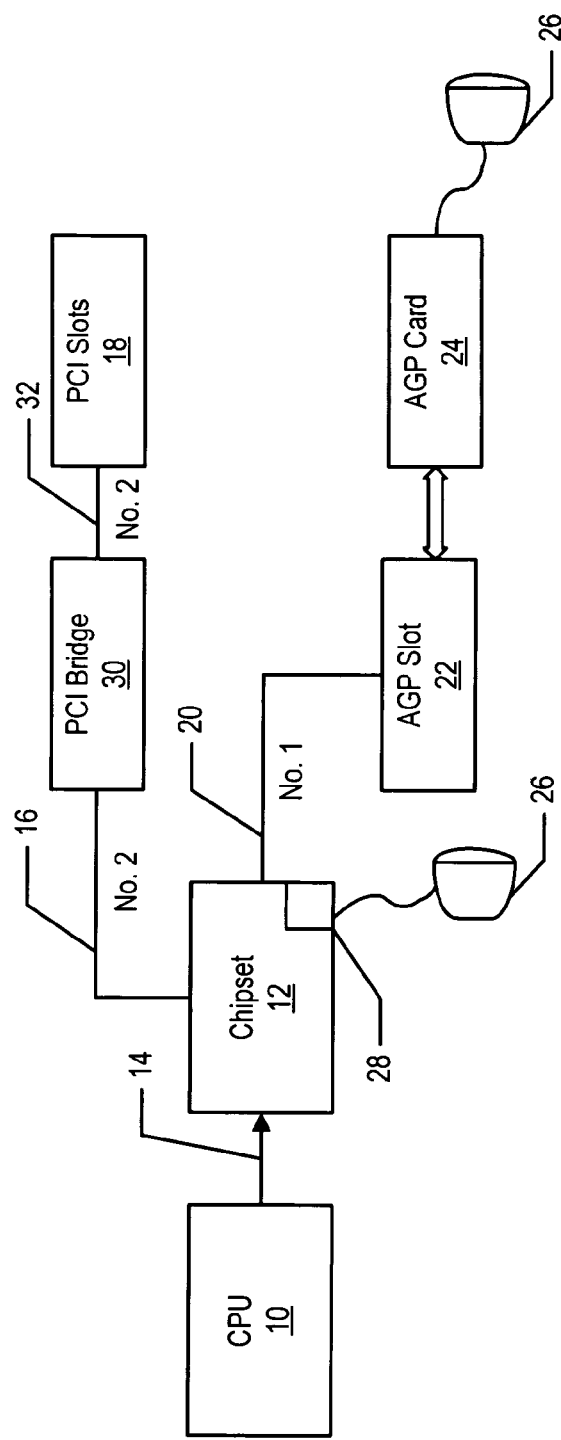
FIG. 2B depicts a block diagram of an information handling system having a disabled selectively hidden device and an active preceding bus.

Referring now to FIGS. 2A and 2B, an example of one embodiment of the present invention illustrates management of PCI bus numbering in a computer system. FIG. 2A depicts a CPU 10 interfaced with a chipset 12 through a host bus 14. Chipset 12 supports a PCI bus 16 that communicates with PCI slots 18. Chipset 12 also supports an inactive PCI bus 20 that interfaces with an AGP slot 22. Chipset 12 includes an integrated video controller 28 to display information through a display 26. For instance, Intel Corporation model 815 and 845 chipsets include an integrated video controller 28 that provides a video display port to directly communicate display information without use of a PCI bus. The inactive PCI bus 20 does not take up a number in the PCI bus numbering sequence since AGP slot 22 does not have a card or display interfaced with it. The PCI bus 16 assumes the first number of the PCI bus sequence, for instance the number 1. A PCI to PCI bridge 30 interfaces with PCI bus 16 and with a PCI bus 32 that in turn interfaces with PCI slots 18. PCI bus 16 assumes the first number in the PCI bus numbering sequence, for instance the number 1, and PCI bus 32 assumes the second number in the PCI bus numbering sequence, for instance the number 2. Thus, PCI bridge 30 is associated with the PCI bus numbering sequence for PCI bus number I and devices interfaced with PCI slots 18 are associated with the PCI bus numbering sequence for PCI bus number 2.

PCI bridge 30 provides a selectively hidden device that, when enabled, takes up a number in the PCI bus numbering sequence and, when disabled, does not take up a number in the PCI bus numbering sequence. To accomplish the limited function of assuming a bus number when enabled, PCI bridge 30 may include limited functionality to reduce costs, such as functionality for accepting enabling and disabling commands without functionality to support devices behind it. As illustrated in FIG. 2B, PCI bridge 30 manages PCI bus numbering by releasing a PCI bus number when a peripheral device interfaces with a PCI bus having a preceding number. For instance, if an AGP card 24 is inserted into AGP slot 22 to support a video display 26 through PCI bus 22, PCI bridge 30 is disabled to release the first number in the PCI bus numbering sequence to PCI bus 20. PCI bus 16 assumes the second number in the PCI bus numbering sequence and PCI bus 32 continues with the second number in the PCI bus numbering sequence. When PCI bridge 30 is disabled, it becomes a phantom pass-through unit not detectable by the operating system so that it no uses a number in the PCI bus numbering sequence. Thus, PCI bus 20 takes number 1 in the PCI bus numbering sequence and PCI buses 16 and 32 are viewed by the information handling system as a single PCI bus with the number 2 in the PCI bus numbering sequence.

PCI bridge 30 manages PCI bus numbering in a similar manner when devices are removed from an information handling system. For instance, if AGP card 24 and display 26 are removed from an information handling system to change the configuration from that of FIG. 2B to FIG. 2A, then PCI bridge 30 is enabled so that PCI bus 16 associated with PCI bridge 30 assumes the PCI bus number of the PCI bus associated with the removed preceding peripheral device. Thus, PCI bridge 30 is enabled to assume PCI bus number 1 of the PCI bus numbering sequence for PCI bus 16 and PCI bus 20 becomes inactive, no longer using a PCI bus number. PCI bus 32 is thus managed by PCI bridge 30 to maintain number 2 in the PCI bus numbering sequence whether or not PCI bus 20 is active. In alternative embodiments, additional PCI bridges may be used to manage PCI bus numbering for additional PCI buses by placing one or more PCI bridges along each PCI bus and managing the status of the PCI bridges as either enabled or disabled when devices having preceding numbering in the PCI bus numbering sequence are interfaced with or removed from the information handling system.

Figure 3:
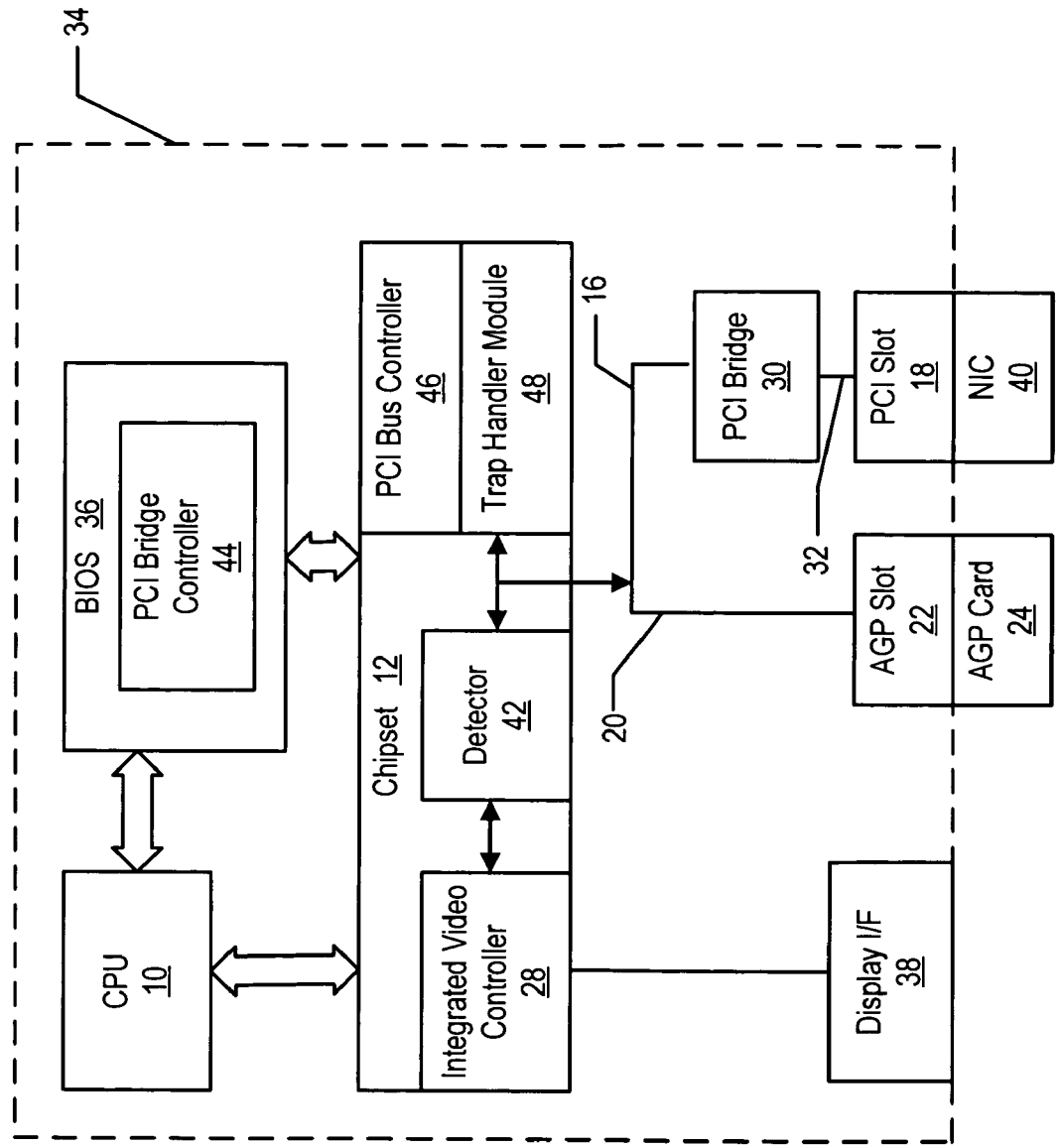
FIG. 3 depicts a block diagram of a computer system mother board that manages PCI bus number by enabling and disabling a PCI bridge associated with a following PCI bus.

Referring now to FIG. 3, a block diagram depicts a motherboard 34 supporting a hidden device for managing PCI bus numbering. Motherboard 34 supports communication between CPU 10, chipset 12 and a basic input/output system (BIOS) 36. BIOS 36 coordinates communication between physical devices of an information handling system and CPU 10 to allow an operating system running on CPU 10 to operate the physical devices. Although FIG. 3 depicts a motherboard 34 that operates in a personal computer, for purposes of this disclosure, an information handling system may include any instrumentality or aggregate of instrumentalities operable to compute, classify, process, transmit, receive, retrieve, originate, switch, store, display, manifest, detect, record, reproduce, handle or utilize any form of information, intelligence, or data for business, scientific, control or other purposes. For example, an information handling system may be a personal computer, a network storage device, or any other suitable device and may vary in size, shape, performance, functionality and price. The information handling system may include random access memory (RAM), one or more processing resources such as a CPU, or hardware or software control logic, ROM and/or other types of nonvolatile memory. Additional components of the information handling system may include one or more disk drives, one or more network ports for communicating with external devices as well as various input and output (I/O) devices, such as a keyboard, a mouse and a video display. The information handling system may include one or more buses operable to transmit communications between the various hardware components, with the various buses using a selectively hidden device to manage bus numbering.

In the configuration depicted by FIG. 3, chipset 12 includes an integrated video controller 28 which provides a display interface port 38 to support display of information on a video display. A NIC card 40 is interfaced with one of plural PCI slots 18 to support network communications, such as Ethernet communications over a local area network (LAN). A detector 42 interfaces with PCI bus 20 and integrated video controller 28 to determine whether a display is interfaced with AGP slot 22 through AGP card 24. Although detector 42 is depicted as integrated with chipset 12, in alternative embodiments, detector 42 may reside as hardware or software in other locations of the information handling system. For instance, detector 42 may reside as instructions in BIOS 36, in a driver operating in conjunction with the operating system running on CPU 10 or as a simple physical switch located in AGP slot 22 that sends a signal to BIOS 36 if an AGP card 24 is inserted into AGP slot 22.

Detector 42 communicates with a PCI bridge controller 44 to update the status of the devices interfaced with PCI bus 20. For instance, PCI bridge controller 44 resides as instructions operating on BIOS 36 to receive the status of devices interfaced with PCI bus 20 from detector 42 when the information handling system is booted. If detector 42 detects that PCI bus 20 is inactive, meaning for instance that an AGP card 24 is not installed in AGP slot 22 or, as another example, that display I/F port 38 is supporting an active display monitor, then PCI bridge controller 44 signals PCI bridge 30 to be enabled. In its enabled state, PCI bridge 30 results in PCI bus 16 having a first number in the PCI bus numbering sequence and PCI bus 32 in having a second number in the PCI bus numbering sequence. For instance, PCI bus numbering may be assigned by the operating system as the information handling system boots to an operational state. If detector 42 detects that PCI bus 20 is active, meaning for instance that AGP card 24 is inserted in AGP slot 22 and supporting a display, then PCI bridge controller 44 signals PCI bridge 30 to be disabled. In its disabled state, PCI bridge 30 results in PCI bus 16 and PCI bus 32 having the same PCI bus number. Since PCI bus 20 is active, it will have the first number of the PCI numbering sequence and PCI buses 16 and 32 will have the second number in the PCI bus numbering sequence. Thus, PCI bridge controller 44's selective enabling or disabling of PCI bridge 30 allows PCI slots 18 to remain associated with the same PCI bus number whether or not PCI bus 20 is active.

Management of PCI bus numbering by a selectively hidden device recognized and controlled by BIOS 36, such as PCI bridge 30, allows identification and control of devices interfaced with an information handling system to be run with an operating system without re-configuration of interfaced devices when a preceding PCI bus changes from an inactive to an active state. For instance, with operating systems that lack plug and play capability, such as WINDOWS NT version 4.0, the insertion of an AGP card associated with a PCI bus results in the disabling of PCI bridge 30 so that the PCI bus associated with the AGP card assumes the first PCI bus number from the PCI bus associated with PCI bridge 30. PCI slots 18 continue to maintain the second PCI bus number as the disabling of PCI bridge 30 removes it from the PCI bus numbering sequence of the operating system, thus eliminating or reducing the need to re-configure devices associated with PCI slots 18, such as a NIC 40. In systems with plug and play capability, such as WINDOWS XP, the disabling of PCI bridge 30 reduces or eliminates the need for re-configuration of devices associated with PCI slots 18 since those devices will continue to be associated with the same PCI bus number and will not need to be recognized and re-configured by the operating system. Thus, BIOS 36 uses PCI bridge controller 44 as a selectively hidden device to manage PCI bus numbering by controlling whether or not PCI bridge 30 is detectable by the operating system. In alternative embodiments with alternative buses, hidden devices, such as bridges, may be used in a similar manner by the BIOS to manage the operating system bus numbering.

In an alternative embodiment also depicted by FIG. 3, the hardware PCI bridge 30 may be replaced by a software or firmware module that creates communications over PCI bus 16 to simulate the presence of a hardware device. For instance, a PCI bus controller 46 associated with chipset 12 coordinates communications over PCI buses 16 and 20 by handling input/output accesses to PCI addresses and data registers. A trap handler module 48 runs instructions on PCI bus controller 46 that handles input/output accesses to create the appearance of a device when enabled and eliminate the appearance of the device when disabled. For instance, trap handler module 48 creates the appearance of a PCI bridge associated with PCI bus 16 if PCI bus 20 is inactive so that a first PCI bus number is assigned to the "virtual" PCI bridge and a second PCI bus number is assigned to PCI slots 18. If PCI bus 20 becomes active, such as due to the interfacing of an AGP card 24 and a display device with PCI bus 20, then trap handler module 48 is disable. Once trap handler module 48 is disabled, the virtual PCI bridge disappears to free the first PCI bus number for use by PCI bus 20 and allows the devices associated with PCI slots 18 to maintain the second PCI bus number. For instance, the virtual device is enabled and disabled by selectively processing or not processing input/output accesses to the PCI address and PCI data registers, CF8h and CFCh respectively. In an alternative embodiment, trap handler module 48 is associated with BIOS 36 to interact with the SMI handler for trapping PCI bus accesses. Alternatively, trap handler module 48 may reside in a function specific hardware device interfaced with chipset 12 and/or BIOS 36 or may reside in other hardware devices that support instructions to handle PCI bus accesses.

Figure 4:
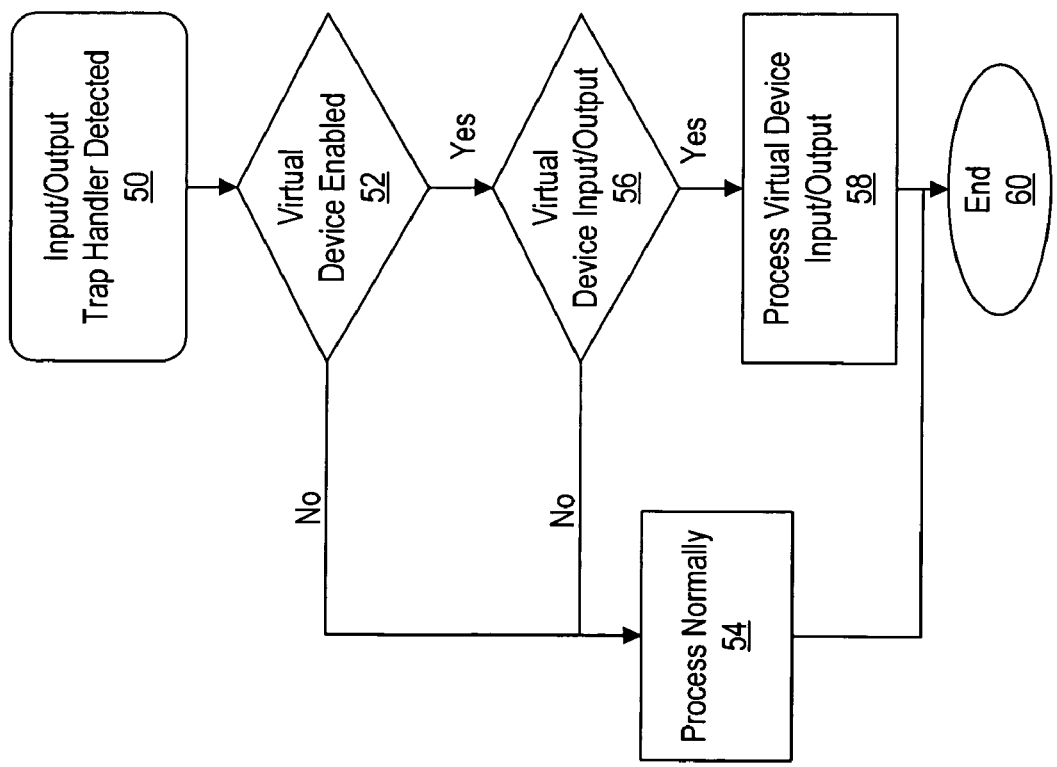
FIG. 4 depicts a flow diagram of trap handler steps for enabling and disabling a virtual device associated with a PCI bus.

Referring now to FIG. 4, a flow diagram depicts the logic for instructions to selectively hide a virtual PCI bridge. The process begins at step 50 with the detection of the trap handler module 48 as interfacing with the PCI bus. At step 52, a determination is made of whether the virtual PCI bridge device is enabled. For instance, if the BIOS 36 detects that PCI bus 20 is inactive, then PCI bridge controller 44 enables trap handler module 48 to represent a device on PCI bus 16. If BIOS 36 detects that PCI bus 20 is active, the PCI bridge controller 44 disables trap handler module 48 so that a device is not represented on PCI bus 16, thus allowing PCI bus numbering of existing devices of PCI bus 16 to remain unchanged after the addition of a device to PCI bus 20. In alternative embodiments, the location of functionality for detecting the addition of a device to a PCI bus, for enabling and disabling the virtual device representation and for handling the trapping of input/output accesses may be distributed through instructions performed on various devices of an information handling system. In one alternative embodiment, a separate hardware device may be interfaced with the information handling system to handling the detection, enable/disable and PCI access functions. Alternatively, the functions may be distributed as hardware, firmware and/or software between both a separated and existing devices.

If the determination at step 52 is that a virtual device is not enabled, then the process proceeds to step 54 for normal processing of the input/output accesses. If the determination at step 52 is that a virtual device is enabled, then the process proceeds to step 56 for a determination of whether the input/output access is to a virtual device or an existing physical device, such as a device interfaced with a PCI slot 18. If the access is not to the virtual device, then the process proceeds to step 54 for normal processing of the access. If the input/output access is to the virtual device, then the process proceeds to step 58 for the processing of the input/output access by the trap handler module so that the operating system provides a bus number to the virtual device. The process ends at step 60.

Both the software and hardware embodiments of the selectively hidden device provide management of bus numbering so that the interfacing of a device that uses a bus number will allow predetermined management of the bus numbering of existing devices, such as maintaining the same bus numbering for the existing devices. In a specific example of a chipset having an integrated video controller, the addition of an AGP card to a PCI bus results in the use of the selectively hidden device's bus number for the AGP PCI bus and allows peripheral devices to remain configured with the operating system using the same bus number. The software embodiment offers the advantages of greater flexibility and simplicity of design along with reduced cost. For instance, if the operating system of the information handling system changes or is updated to otherwise maintain bus numbering, an update to the BIOS instructions adapts the selectively hidden device enabling and disabling as appropriate. However, the functions of the present invention may be distributed in an information handling system through existing and added hardware, firmware and software components.

Although the present invention has been described in detail, it should be understood that various changes, substitutions and alterations can be made hereto without departing from the spirit and scope of the invention as defined by the appended claims.

What is claimed is:

1. A system for managing information handling system, the system bus numbering comprising:
   a chipset for communicating with a video device through one of an integrated video controller or a video device card inserted in a video device card slot, the chipset operable to interface with the video device card through a first bus;
   a bridge interfaced with the chipset through a second bus, the second bus having a first portion with a numbering identification associated with the bridge;
   one or more slots interfaced with the bridge through the second bus, the second bus having a second portion with a numbering identification associated with the slots; and
   a bridge controller interfaced with the bridge and operable to disable the bridge if the chipset is interfaced with the video device card through the first bus, the disabling of the bridge maintaining the numbering identification of the second bus associated with the slots.

2. The system of claim 1 further comprising a video device card detector operable to detect the interfacing of the video device card with the chipset.

3. The system of claim 2 wherein the video device card detector comprises instructions associated with the chipset.

4. The system of claim 2 wherein the video device card detector comprises a switch associated with the video device card slot to detect insertion of a video device card.

5. The system of claim 1 wherein the bridge controller comprises instructions operating on the computer BIOS.

6. The system of claim 1 wherein the video device card comprises an AGP card.

7. The system of claim 1 wherein the bridge controller is further operable to enable the bridge if the video device card is not interfaced with the chipset, the enabling of the bridge maintaining the numbering identification of the second bus associated with the slots.

8. A method for managing the numbering identification of buses of an information handling system, the method comprising:
   interfacing a bridge with a chipset through a first bus;
   assigning a bridge numbering identification to the first bus for the interface between the chipset and the bridge;
   interfacing one or more slots with the bridge through the first bus;
   assigning a slot numbering identification to the first bus for the interface between the bridge and the one or more slots;
   interfacing a device with the chipset through a second bus;
   disabling the bridge to assign the first bus the slot numbering identification and to assign the second bus the bridge numbering identification.

9. The method of claim 8 wherein interfacing a device further comprises interfacing a video device card.

10. The method of claim 9 wherein the chipset comprises an integrated video controller.

11. The method of claim 10 wherein the video device card comprises an AGP card.

12. The method of claim 8 further comprising:
   detecting the interfacing of the device; and
   disabling the bridge upon detection of the device.

13. The method of claim 12 further comprising:
   detecting removal of the device; and
   enabling the bridge upon detection of the removal of the device to the assign the bridge numbering identification to the bus between the chipset and the bridge and to maintain the slot number identification to the bus between the bridge and the slots.

14. A method for managing the numbering identification of buses of a computer system, the method comprising:
   interfacing a trap handler module with a first bus;
   trapping input/output access to the first bus to simulate a physical device having a first number in the bus numbering sequence;
   interfacing one or more slots with the first bus;
   assigning a second number in the bus numbering sequence to the first bus for the interface with the one or more slots;
   interfacing a device with a second bus;
   disabling the trap handler module by ceasing the trapping of input/output accesses to the first bus; and
   assigning the first number in the bus numbering sequence to the second bus.

15. The method of claim 14 further comprising:
   detecting the interfacing of the device with the second bus; and commanding the disabling of the trap handler module upon detecting the interfacing of the device with the second bus.

16. The method of claim 15 wherein interfacing a device with the second bus further comprises interfacing a video card with the second bus.

17. The method of claim 16 wherein:
detecting the interfacing further comprises detecting the video card with the computer BIOS; and
disabling the trap handler module further comprises signaling the trap handler module from the BIOS.

18. A system for managing bus numbering of a computer, the system comprising:
a chipset for communicating with a video device through one of an integrated video controller or a video device card inserted in a video device card slot, the chipset operable to interface with the video device card through a bus;
a bus access controller interfaced with the bus, the bus access controller having instructions to selectively enable or disable a virtual device, the virtual device associated with a first bus number when enabled;
one or more slots interfaced with the bus, the slots having one or more peripheral devices associated with a second bus number; and
a detector interfaced with the bus access controller, the detector operable to disable the virtual device if the chipset is interfaced with the video device card through the bus, the disabling of the virtual device maintaining the bus number associated with the peripheral devices.

19. The system of claim 18 wherein the detector comprises instructions operating on the BIOS of the computer system.

20. The system of claim 18 wherein the detector comprises instructions associated with the chipset.

21. The system of claim 18 wherein the instructions of the bus access controller enable the virtual device by trapping input/output accesses associated with the bus number of the virtual device.

22. The system of claim 21 wherein the bus access controller instructions operate in the computer system BIOS in coordination with the SMI handler.

23. The system of claim 21 wherein the bus access controller instructions operate in a bus controller associated with the computer system chipset.

24. The system of claim 21 wherein the bus access controller instructions and the detector instructions operate on a common hardware device interfaced with the bus.

25. The system of claim 21 wherein the common hardware device comprise a function specific device for supporting the enabling and disabling of the virtual device.

26. The system of claim 18 wherein the instructions of the controller disable the virtual device by not processing input/output accesses associated with the bus number of the virtual device.

* * * * *